Patented Feb. 13, 1940

2,190,369

UNITED STATES PATENT OFFICE 2,190,369

TRANSFORMATION OF ORGANIC COMPOUNDS

Francis Owen Rice, Baltimore, Md., assignor, by mesne assignments, to Process Management Company, Inc., New York, N. Y., a corporation of Delaware No Drawing. Application January 23, 1937, Serial No. 121,987

4 Claims. (Cl. 260—680)

My invention relates broadly to the transformation of organic compounds and more specifically to the transformation of unsaturated cyclic compounds, such as unsaturated cyclic hydrocarbon compounds, into organic compounds containing double bonds, such as, for example, polyolefins.

The results of prior operations of this general character have been unsatisfactory in that the yields of desired products have been relatively low. In the light of this invention it seems probable that the reactions of the products with the original material undergoing treatment are substantially prevented. The reactions between the desired products themselves and/or the reactions between the desired product and the material undergoing treatment, which will be referred to hereinafter as secondary reactions, result in the formation of products generally of higher molecular weight than the desired product. For example, it is frequently desired to produce ethylene and butadiene by the decomposition of cyclohexene. Results heretofore obtained from decomposing cyclohexene show a relatively high proportion of secondary reaction products to the desired primary reaction products, the secondary reaction products in general serving no useful purpose and therefore being a waste product of such a process.

My invention overcomes the disadvantages heretofore encountered in the decomposition of unsaturated cyclic compounds by controlling the reaction so as to produce substantially only primary reaction products.

An object of my invention is to provide a process for transforming unsaturated cyclic compounds into organic compounds containing double bonds without obtaining a substantial quantity of products of higher molecular weight than the primary reaction products.

A more specific object of my invention is to provide a process for decomposing unsaturated cyclic hydrocarbon compounds into polyolefins without the formation of higher molecular weight hydrocarbons.

Further objects of my invention will appear as the description thereof further proceeds.

My invention applies to unsaturated cyclic hydrocarbons, of which cyclohexene is an example, to cyclic ketones, of which cyclohexanone is an example, to cyclic chlorinated hydrocarbons, of which 1-chlor-cyclohexene is an example, to cyclic hydrocarbons having unsaturated side chains, of which terpinolene is an example, and to cyclic hydrocarbons having more than one ring, of which A-pinene is an example. The specifically mentioned unsaturated cyclic compounds are given for illustrative purposes only, it being clearly understood that many other compounds of similar structure may be cited. These specifically mentioned compounds and others of similar structure have been and will be referred to hereinafter as unsaturated cyclic compounds.

In accordance with my invention, unsaturated cyclic compounds are passed through a suitable non-catalytic heating zone wherein they are subjected to conditions of time, temperature, and pressure suitable for accomplishing limited transformation thereof without objectionable secondary reactions taking place. The unsaturated cyclic compounds are thermally decomposed at a temperature of between about 1100° F. and 1500° F., preferably at a temperature of between about 1200° F. and 1400° F. in the non-catalytic heating or reaction zone. It is preferable to maintain the unsaturated cyclic compounds undergoing transformation at an absolute pressure of from about 10 mm. to 20 mm. of mercury. Pressures lower than 10 mm. may be used but it is generally undesirable to go to pressures appreciably higher than 20 mm. as with increased pressure the proportion of higher molecular weight material formed as a result of secondary reactions is appreciably increased.

I have discovered in transforming unsaturated cyclic compounds under the conditions of operation above set forth that the primary reaction products formed as a result of the transformation do not instantaneously or within a relatively short period of time react with themselves or with the material undergoing transformation. My invention therefore contemplates controlling the transformation reaction period in such a manner as to effect a limited transformation into substantially only primary reaction products. This limited transformation, which should not exceed about 25%, is accomplished by regulating and carefully controlling the time or residence of the unsaturated cyclic compound undergoing transformation in the reaction zone. I have found that best results are obtained by regulating the residence of the unsaturated cyclic compound undergoing transformation in the reaction zone so that a relatively short period of time elapses for the limited transformation to take place. I have found under the temperature and pressure conditions heretofore specified that generally the time required to effect the desired transformation should not exceed about $\frac{1}{10}$ of a second and should generally be between $\frac{1}{60}$ of a second and $\frac{1}{10}$ of a second. In addition to controlling the time of reaction, the beneficial results are further enhanced by operating at relatively high temperatures, such as above specified.

By correlating the conditions of operation heretofore mentioned I am able to effect as high as 25% transformation of the unsaturated cyclic compounds being treated into primary reaction products without production of higher molecular weight products which would result when secondary reactions occur.

The unsaturated cyclic compound may be heated in any suitable manner and reacted at the desired temperature in a chamber having non-catalytic surfaces. It is important in practicing my invention to prevent the particular compounds undergoing transformation from coming into contact with a surface which exerts a catalytic effect upon the transformation reaction as otherwise the catalytic effect will produce excessive reaction resulting in the formation of objectionable quantities of undesirable secondary reaction products.

The products of transformation leaving the heating zone are cooled to a temperature below that at which further transformation thereof takes place. This cooling is preferably carried out as rapidly as possible in order to prevent the undesired secondary reactions from taking place. Various cooling arrangements well understood by those skilled in the art may be used. For example, a suitable heat exchanger having a suitable cooling fluid passing therethrough or adapted to employ suitable refrigeration may be used.

The products of transformation, after being appropriately cooled to a temperature below that at which no further reaction takes place, are passed to a recovery plant where the desired primary reaction products are separated from the unreacted material. This separation may be carried out in a conventional type of fractionating column employing suitable cooling means as well as trays or the like for effecting close separation. Unreacted material separated from the primary reaction products may be disposed of as desired but in general I prefer to recycle this unreacted material in order to increase the overall yield of the process. This recycling may be effected by returning the unreacted material from the fractionating column to the inlet of the heating zone.

The successful practice of my invention is based on my discovery that the transformation of the type of compounds with which we are concerned follows a course quite different from that which applies to other types of hydrocarbons. Specifically it has been found that cyclic olefins decompose directly into olefins and diolefins without involving chain reactions which would make control of the process much more difficult. Although the decomposition of cyclic olefins is believed to involve free radicals, these radicals under properly controlled conditions will undergo simple internal rearrangement to yield the desired product molecules instead of reacting with other molecules or radicals and thus impairing the efficiency of the process.

My work has shown that substantially only primary reaction products are obtained when practicing my invention. While I do not wish to be limited to any particular theory or hypothesis, the following is offered as a possible explanation of the reactions taking place, and by following the reasoning set forth it is always possible to predict the primary reaction products to be obtained when transforming unsaturated cyclic compounds into organic compounds containing double bonds.

I shall illustrate this transformation by reference to cyclohexene. When this substance is heated we may postulate a primary rupture of a C—C bond according to the following equation:

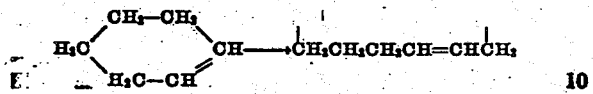

I have selected this method of rupture of a C—C bond rather than one of the two alternative methods because a resonating radical is formed. A resonating radical is one which is capable of being written in two forms, namely, ĊH₂CH₂CH₂CH=CHĊH₂ and ĊH₂CH₂CH₂ĊHCH=CH₂ but since neither of the two forms represents the true formula I prefer to represent it as

in which four of the carbon atoms are written with free valences. It is well known that when this phenomenon occurs, such resonating structures are formed in preference to other structures and consequently we may expect that this primary decomposition occurs in the transformation of such unsaturated cyclic compounds. This means the primary rupture of a C—C bond in the B position to a double bond. This primary formation of the original resonating radical may be followed by a simple electronic rearrangement to give ethylene and butadiene according to the following equation:

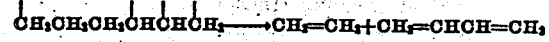

Since this decomposition is probably exothermic and involves nothing more than a change of electronic configuration, the reaction represented by the last equation predominates.

In view of the large number of procedures recommended for the thermal transformation of unsaturated cyclic organic compounds it seems desirable to consider the principles involved in this transformation. Each of these transformations consists of a primary unimolecular decomposition into a resonating radical followed by a second unimolecular decomposition into one or more organic compounds containing double bonds. Since we wish to preserve these product molecules undecomposed, we must consider their unimolecular decomposition as well as possible bimolecular reactions of the products with themselves and with the original material. For the simpler cyclic structures, such as cyclohexene, the unimolecular decomposition of the products may be disregarded since from this standpoint they are much more stable than the original substance; for larger molecules, the products may be preserved from any unimolecular decomposition by decomposing the original substance to a relatively small extent, between 10 and 25%. The more important reaction to avoid, however, is a bimolecular reaction between the product molecules themselves and a similar bimolecular reaction between the product molecules and the original substance. By conducting the thermal transformation to a limited degree at low pressures, all of these bimolecular reactions may be rendered negligible without affecting the unimolecular reactions that give the desired products. Moreover, by conducting the reaction at a relatively high temperature the desired unimolecular reactions relative to the undesired bimolecular reactions are favored.

The decomposition of cyclohexene into a resonating radical followed by its decomposition into product molecules is characteristic of unsaturated cyclic compounds and the application of this theory to a few such cyclic compounds will now be shown.

1. Decomposition of cyclohexanone

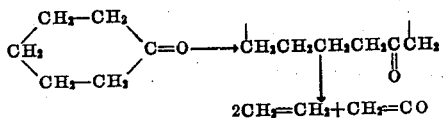

The above equations show the decomposition of cyclohexanone which produces first a resonating radical which then falls apart into one molecule of ketene and two molecules of ethylene.

1. 1-chloro-cyclohexene

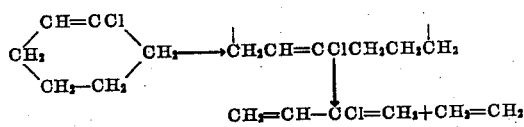

This compound also decomposes first into a resonating radical and then into 2-chloro-butadiene, 1,3, and ethylene.

3. Decomposition of terpinolene

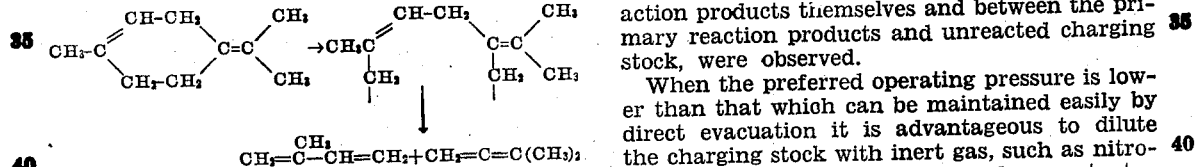

As predicted by the theory, this compound yields one molecule of dimethylallene and one molecule of isoprene.

While the foregoing is offered as a theory or hypothesis whereby those skilled in the art may more readily understand the mechanism of the controlled reactions in accordance with my invention, the following examples will further illustrate the nature of this invention, it being clearly understood, however, that the invention is not restricted to these specific examples.

*Example 1*

Cyclohexene is reacted at a temperature of about 1385° F. while under an absolute pressure of 15 mm. for about 1/40 of a second. With a single passage of the cyclohexene through the reaction zone under these conditions about 20% thereof was transformed into primary reaction products; for each mol of charging stock transformed, one mol of butadiene and one mol of ethylene were recovered.

*Example 2*

Cyclohexanone is reacted at a temperature of about 1400° F. while under an absolute pressure of about 10 mm. for about 1/25 of a second. With a single passage of the cyclohexanone through the reaction zone under these conditions about 15% thereof was transformed into primary reaction products; for each mol of the charging stock transformed, one mol of ketene and two mols of ethylene were recovered.

*Example 3*

1-chloro-cylohexene is reacted at a temperature of about 1275° F. while under an absolute pressure of about 10 mm. for about 1/20 of a second. With a single passage of 1-chloro-cyclohexene through the reaction zone about 18% thereof was transformed into primary reaction products; for each mol of the charging stock transformed, one mol of 2-chloro-butadiene 1,3 and one mol of ethylene were recovered.

*Example 4*

Terpinolene is reacted at a temperature of about 1255° F. while under an absolute pressure of about 8 mm. for about 1/50 of a second. With a single passage of the charging stock through the reaction zone 20% thereof was transformed into primary reaction products; for each mol of terpinolene transformed, one mol of dimethylallene and one mol of isoprene were recovered.

*Example 5*

A-pinene was reacted at a temperature of about 1300° F. while under an absolute pressure of about 7 mm. for about 1/50 of a second. With a single passage of the A-pinene through the reaction zone about 10% transformation thereof was effected; for each mol of A-pinene transformed, one mol of ocimene was recovered, no other primary reaction products being recovered.

In each of the foregoing examples no appreciable secondary reaction products, such as would be formed by reactions between the primary reaction products themselves and between the primary reaction products and unreacted charging stock, were observed.

When the preferred operating pressure is lower than that which can be maintained easily by direct evacuation it is advantageous to dilute the charging stock with inert gas, such as nitrogen or water vapor. For example, one to ten volumes of diluent gas could be added to each volume of charging stock, with a corresponding increase in the total pressure in the reaction zone.

From the foregoing it is apparent that my invention provides a process for producing substantially only primary reaction products from unsaturated cyclic compounds. While the primary reaction products, which are broadly organic compounds containing double bonds, may be successfully used themselves for various purposes, it may be more desirable to subject them to further treatment to produce higher molecular weight compounds therefrom. For example, the primary reaction products and particularly the polyolefins obtained by decomposing unsaturated cyclic hydrocarbon compounds may be converted under suitable conditions of elevated temperature and pressure, preferably without the aid of a catalyst, to higher molecular weight hydrocarbons admirably suited for use as or inclusion with motor fuel.

Obviously, many variations of my invention may be made without departing from the spirit or scope thereof.

I claim:

1. The process of transforming an unsaturated carbo-cyclic non-aromatic compound which comprises heating such a compound under non-catalytic conditions to a temperature of between about 1100°–1500° F. at a pressure not substantially in excess of about 20 mm. and maintaining said compound at said reaction temperature for a time of between 1/10–1/50 of a second to transform a limited quantity of said compound into substantially only organic compounds containing double bonds as primary reaction products.

2. The method in accordance with claim 1 wherein said unsaturated carbo-cyclic non-aromatic compound is a carbo-cyclic hydrocarbon.

3. The method in accordance with claim 1 wherein said unsaturated carbo-cyclic non-aromatic compound is a carbo-cyclic ketone.

4. The method in accordance with claim 1 wherein said unsaturated carbo-cyclic non-aromatic compound is a cyclic hydrocarbon having more than one ring.

FRANCIS OWEN RICE.